E. I. BRADDOCK.
ANIMAL-TRAP.
No. 192,108.
Patented June 19, 1877.
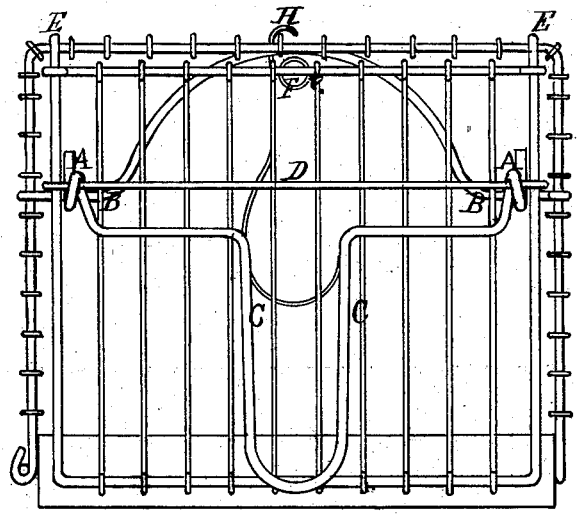
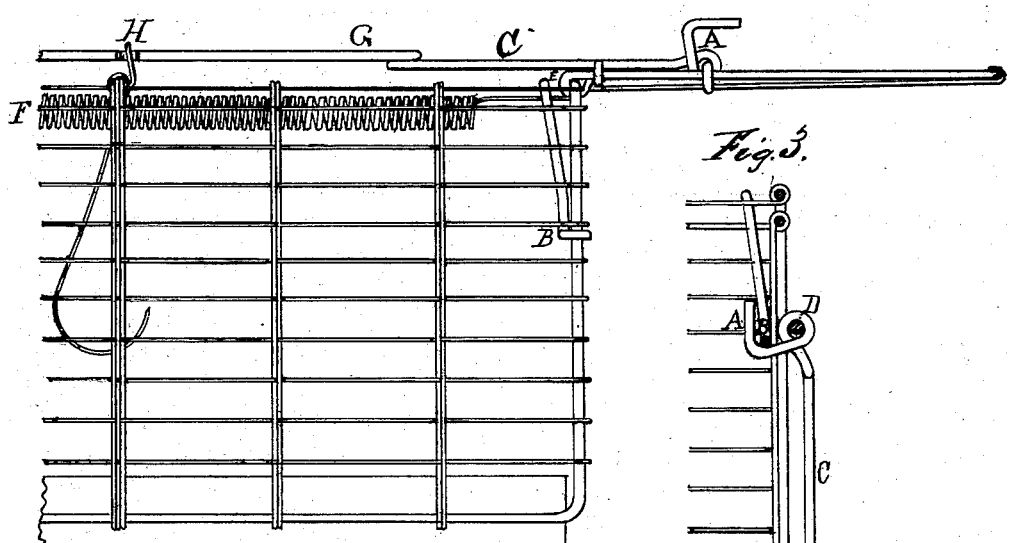
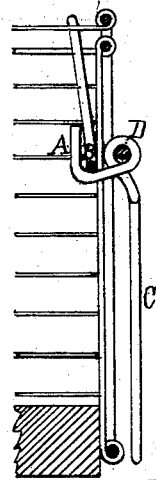
Witnesses
Robert H. Duncan
Benj. A. Smith
Inventor
Edward I. Braddock
by Saml A. Duncan
his atty.

UNITED STATES PATENT OFFICE.

EDWARD I. BRADDOCK, OF LOWELL, MASS., ASSIGNOR TO SAMUEL SEWALL, JR., AND GEORGE A. MARDEN, OF SAME PLACE.

IMPROVEMENT IN ANIMAL-TRAPS.

Specification forming part of Letters Patent No. 192,108, dated June 19, 1877; application filed October 5, 1876.

*To all whom it may concern:*

Be it known that I, EDWARD I. BRADDOCK, of Lowell, in the county of Middlesex, State of Massachusetts, have invented a new and useful Improvement in Locks for Animal-Traps, of which the following is a specification:

This invention relates to locks for animal-traps; and consists in, first, swinging hooks so arranged upon the door of the trap that when the trap is sprung and the door falls they shall take automatically into catches or detents provided in the body of the trap, and lock the door; second, an arm or handle, in combination with the swinging hooks, to facilitate the turning of the hooks upon their fastenings; third, the combination of the arm or handle, to which the hooks are attached, with the mechanism by which the trap is set, to keep the hooks in position to catch their detents when the trap is sprung and the door falls.

The lock to which this invention relates may be conveniently applied to traps whose doors are hinged at the upper edge and so arranged as to swing upward when opened. The swinging hooks may be attached to an arm or handle which swings with the door, and serves the following purposes: First, a convenient handle for lifting and carrying the trap; second, a convenient device for setting the trap; third, to assist the turning of hooks when the door strikes in its descent; and, fourth, to keep the hooks engaged with their detents.

The invention is illustrated in the accompanying drawing, which forms a part of this specification, in which—

Figure 1 is an end elevation of the trap when locked; Fig. 2, a side elevation of the same when set or open; and Fig. 3, a section of the end of the trap on the line $x\,x$ of Fig. 1, to show the position of the various parts when the door has fallen and the hooks are in engagement with their detents.

In the drawing, A A represent the swinging hooks; B, bar which forms the detents for the hooks; C, arms or handle attached to the swinging hooks; D, cross-bar on the door, to which the hooks are hinged; E E, hinges connecting the door to the body of the trap; F, spring which closes the door; G, hinged bar which overrides the end of the arm or handle C, and holds the door open when the trap is set.

The hooks A A are conveniently and economically formed from the same piece of wire as the arms or handle C, the wire being loosely twisted around the cross-bar D, so as to form hinges upon which the hooks and the handle turn easily.

Convenient detents for the hooks A A may be formed by a cross-bar extending across the doorway, and secured at either end to the marginal wires of the body of the trap. This cross-bar may be curved upward in its central part, so as not to obstruct the entrance. The location of the parts of the bar which lie directly opposite the hooks should be such that when the hooks swing downward and inward they will make secure engagement with it. This construction is illustrated in Figs. 1 and 2 of the drawing.

The operation of the device is as follows: The trap may be set in any desirable way—*e. g.*, the end of the handle C may be held down by the hinged bar G, and this bar in turn by the catch H. When the trap is sprung, the contraction of the spring F suddenly pulls the door inward and closes the entrance. The swinging hooks A A and the handle C, of course, follow with the door, but maintain the same relative position with it as they occupied when the trap was set—*i. e.*, they do not turn upon their hinges until the door strikes the end of the trap, when the handle and the hooks at once swing over and take a reverse position, and the hooks pass under and engage the bar B, and the fastening is completed.

The improvement described is simple in construction, sure in its operation, and affords a secure fastening.

What is claimed as new is—

1. As a fastening or lock for traps, automatic swinging hooks arranged upon the door of the trap, in combination with detents or fastenings upon the body of the trap, substantially as and for the purpose set forth.

2. In combination with the swinging hooks, a swinging arm or handle, arranged to operate substantially as and for the purpose set forth.

3. In combination with the arm or handle attached to the swinging hooks, a bar which overrides the end of the handle when the trap is set, substantially as and for the purpose set forth.

E. I. BRADDOCK.

Witnesses:
W. S. SOUTHWORTH,
E. M. GARDNER.